United States Patent [19]

Bräutigam et al.

[11] 3,891,575

[45] June 24, 1975

[54] CATALYST FOR PURIFYING EXHAUST GASES

[75] Inventors: Hans Bräutigam, Grossburgwedel; Günter Weidenbach, Anderten; Karl Hermann Koepernik, Hannover, all of Germany

[73] Assignee: Kali-Chemie Aktiengesellschaft, Hannover, Germany

[22] Filed: Jan. 25, 1974

[21] Appl. No.: 436,726

[30] Foreign Application Priority Data
Jan. 27, 1973 Germany............................ 2304001
Jan. 30, 1973 Germany............................ 2304351
Oct. 12, 1973 Germany............................ 2351237

[52] U.S. Cl............ 252/455 R; 252/477 R; 423/213
[51] Int. Cl.²........................................ B01J 29/06
[58] Field of Search.................... 252/455 R, 477 R

[56] References Cited
UNITED STATES PATENTS

| | | | |
|---|---|---|---|
| 2,071,119 | 2/1937 | Harger | 252/477 R X |
| 3,228,892 | 1/1966 | Cole et al. | 252/477 R X |
| 3,410,651 | 11/1968 | Brandenburg et al. | 252/477 R X |
| 3,746,658 | 7/1973 | Porta et al. | 252/477 R X |
| 3,770,389 | 10/1973 | Kitzner et al. | 252/477 R X |

*Primary Examiner*—Paul F. Shaver
*Attorney, Agent, or Firm*—Richard L. Schwaab

[57] ABSTRACT

Disclosed is a highly temperature resistant, thermal shock resistant and break resistant catalyst suitable for the purification of automotive and industrial exhaust gases and a process for preparing such catalyst. The catalyst comprises a non-rusting, scale-free, highly heat resistant metallic skeleton having thereon an elastic priming layer of aluminum silicate, an outer layer comprising a catalytically active carrier material and a catalytically active metal or metal oxide distributed on the carrier layer.

28 Claims, 2 Drawing Figures

CATALYST FOR PURIFYING EXHAUST GASES

BACKGROUND OF THE INVENTION

The present invention relates to a catalyst and method of preparing same, and more particularly to a catalyst suitable for purifying industrial and automobile exhaust gases.

In order to catalytically remove harmful compounds from industrial and automobile exhaust gases, there can be employed either loose bed catalysts or catalysts having a honeycomb structure. Loose bed catalysts have the disadvantage in comparison to honeycomb catalysts that they present a greater resistance to the flow of gas therethrough and are subject to abrasive disintegration.

Catalysts having a honeycomb structure, at least insofar as they are manufactured from a ceramic substance, require an expensive mounting so that they do not break as a result of mechanical and thermal stresses. Also, they possess a vary low thermal shock stability, which is especially necessary in the case of a cold start of a vehicle engine.

As a result of these limitations, the suggestion has been made to replace the ceramic structure by a honeycomb structure of metal. However, it is not suitable to distribute catalytically active substances, particularly metals, upon such a metallic surface, because the high temperatures of the exhaust gases cause rapidly a diffusion of the active components into the metallic structure of the honeycomb base, and thus, to inactivation of the catalyst.

In U.S. Pat. No. 3,437,605 it has therefore been proposed that the metallic base be provided with an intermediate layer of aluminum oxide, upon which the active components may then be distributed.

In view of the different co-efficients of expansion, however, the adhesive strength of such layers is so small that they peel off if they are exposed to strong temperature differences. Therefore, such catalysts are not suitable for a long term application under practical conditions, especially under driving conditions for motor vehicles.

There is also known a process for the preparation of catalyst carriers in connection with which carrier structures made of aluminum sheet are completely oxidized. In this manner, however, there is obtained only a carrier which exhibits the disadvantages of the ceramic monolithic structures.

An alternate proposal for the preparation of such honeycomb structures resides in a process wherein a core sheet of steel or another metal having a melting point higher than aluminum is plated with aluminum, is coated by dipping with a fibrous ceramic binder of $Al_2O_3/SiO_2$ and is then burnt at a temperature sufficiently high so that the aluminum is oxidized to aluminum oxide. This mode of manufacture is very expensive, since the plating with aluminum must be accomplished on both sides of the metal sheet. Also, the honeycomb structures manufactured in this manner have the disadvantage that the canal walls are too thick as a result of the aluminum plating, and thus, the volumetric weight of the honeycomb structures is too high.

SUMMARY OF THE INVENTION

It is therefore an object of the present invention to produce a catalyst composition which posseses a high heat shock resistance, a high temperature stability and a high resistance against breakage and attrition and is therefore suitable for purification of industrial and automotive exhaust gases. Another object of the present invention is to produce a catalyst composition which is especially suitable for the combustion of noxious components such as carbon monoxide, hydrocarbons, aldehydes, ammonia and others as well as for the reduction of reducible componends for example nitrogen oxide contained in exhaust gases.

It is also an object to produce a catalyst which has an extremely long life so that it is rendered particularly suitable for use in automobile exhaust gas conversion units.

A further object of the present invention resides in the provision of a method for preparing a catalyst composition meeting the foregoing requirements.

In accomplishing the above-delineated objects, there is provided in accordance with the present invention a highly temperature resistant, thermal shock resistant and mechanical resistant catalyst suitable for the purification of exhaust gases, comprising a non-rusting, scale-free, highly heat resistant cellular metallic skeleton having thereon an elastic priming layer comprising aluminium silicate, an outer layer comprising a catalytically active carrier material and one or more catalytically active metals or metal oxides distributed on the carrier layer. For the oxidation of carbon monoxide and hydrocarbons in automotive exhaust gases the preferred active metal component is either platinum, palladium or a mixture of the two, and is present in an amount between about 0.01 and 1 percent by weight, more preferably between 0.02 and 0.5 percent by weight. For the reduction of nitric oxides in exhaust gases the preferred metallic component is a mixture of ruthenium and platinum in a ratio of from about 1:0.15 to 1:3, and in this case the metal is present in an amount of from about 0.01 to 0.5 percent by weight.

The metallic skeleton is preferably made from an alloy steel, but maay also comprise a normal carbon steel having a coating of an enamel which is heat resistant up to temperatures of about 1,000°C. and possesses a high resistance to thermal shock. Preferred catalytically active carrier materials with which the primed metallic skeleton is coated comprise aluminum oxide and magnesium oxide. In a preferred embodiment of the present invention the layer of catalytically active carrrier material further contains between about 0.5 and 15 percent by weight of one or more highly dispersed rare earth metal oxides, and preferably between about 1 and 7 percent calculated on the applied aluminum oxide or magnesium oxide.

The metallic skeleton may be formed from a band or wire which is rolled up, corrugated or balled up to provide sufficient surface area per unit volume. Other configurations such as tubes, bundles of tubes, rings, saddles or the like may also be employed for the metallic skeleton.

There is also provided in accordance with the invention a process for the preparation of a highly heat resistant, temperature stable and break resistant catalyst suitable for the purification of exhaust gases comprising coating a non-rusting, skeleton with a primer of aluminum silicate, thereafter coating the primed skeleton with a layer of catalytically active carrier material, calcining the coated skeleton at a temperature of from about 600° to 1200°C. and impregnating the catalyst carrier with one or more catalytically active metals or metal oxides. Coating of the metallic skeleton with the primer layer of aluminum silicate can be accomplished either before or after the metal is transformed from stock material into a suitable cellular configuration. This coating step is carried out by dipping the metallic skeleton into an aqueous suspension of fibrous aluminum silicate, which may contain an inorganic binder material.

In one embodiment the layer of catalytically active carrier material is applied by dipping the primed skeleton into an aqueous suspension of highly dispersed aluminum hydroxide and thereafter calcining the coated structure at a temperature between about 600° and 1100°C. In another embodiment the coating is provided by dipping the skeleton into an aqueous suspension of magnesium hydroxide and thereafter calcining at a temperature between about 700° and 1200°C. In a preferred embodiment the aqueous dispersions additionally contain between about 0.5 and 15 percent by weight, and preferably between about 1 and 7 percent by weight, of one or more highly dispersed rare earth metal oxides based on the applied aluminum hydroxide or magnesium hydroxide calculated as $Al_2O_3$ or $MgO$. The size of the rare earth particles is less than about 10 microns and preferably less than about 3 microns, and there are most suitably employed rare earth oxides having a purity of between about 85 and 99.9 percent.

Distribution of the catalytically active metal and/or metal oxide is accomplished in a conventional manner, as by impregnating with a solution containing the catalytically active agent. Alternatively, the steps of coating the skeleton with a layer of catalytically active carrier and impregnating the carrier with a catalytically active metal or metal oxide can be carried out simultaneously.

Other objects, features and advantages of the present invention will become evident from the detailed description of the invention which follows, when read together with the accompanying drawings.

DETAILED DESCRIPTION OF THE INVENTION

Figure 1:
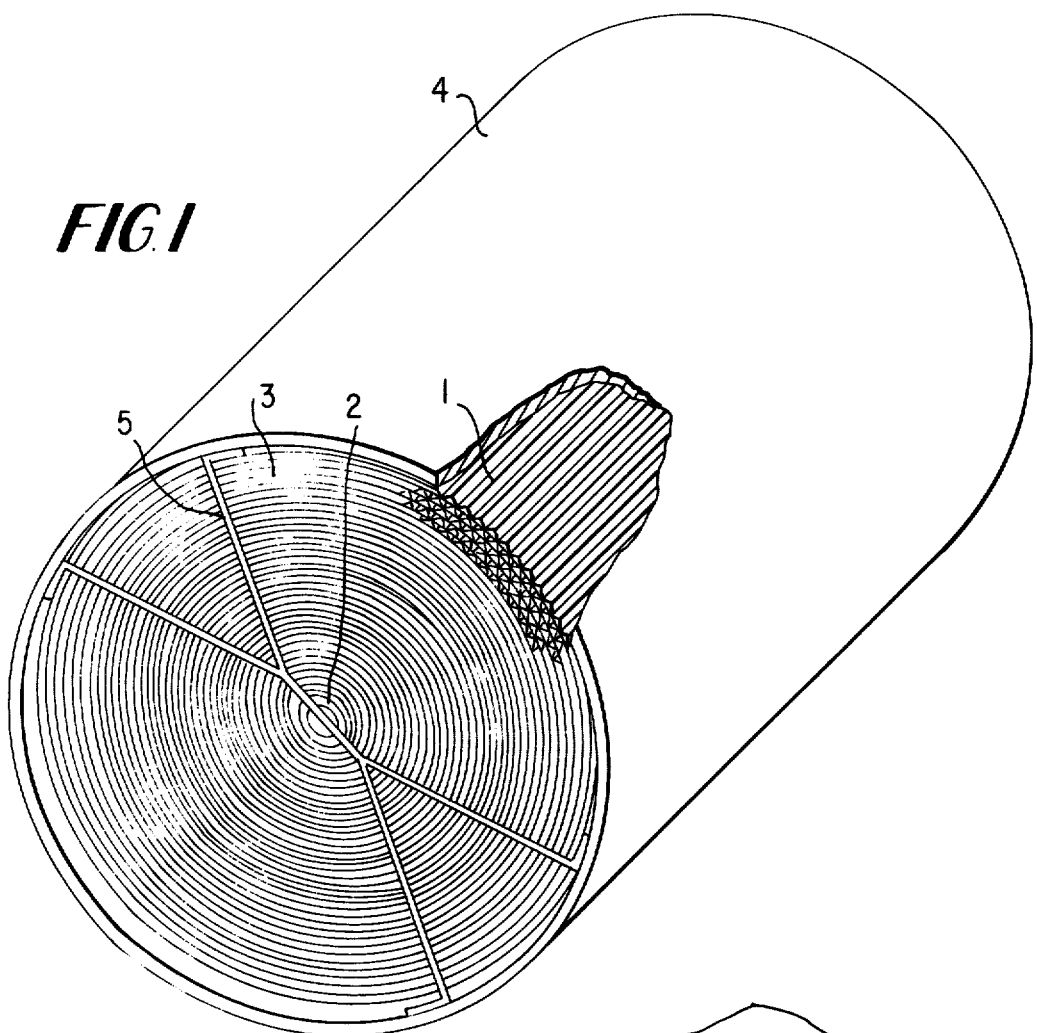
FIG. 1 is a prespective view of a cellular-structured catalyst in accordance with the present invention contained in a tubular container which has been partially cut away.
Figure 2:
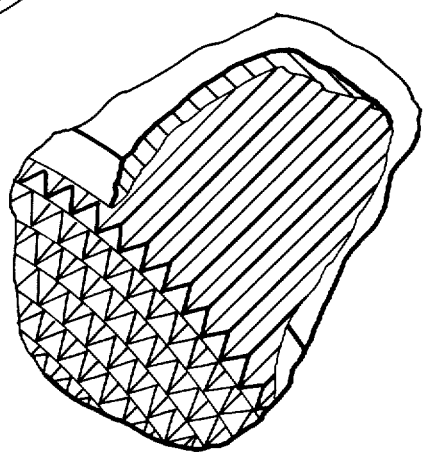
FIG. 2 is a partial view of the catalyst structure in accordance with the present invention.

It has now been discovered that a heat resistant, highly active catalyst for purification of exhaust gases is obtained if a non-rusting, scale-free and highly heat resistant metal skeleton is provided with an elastic primer of aluminum silicate, preferably in the form of aluminum silicate fibers, and after drying at a temperature between 100° and 250°C., preferably at about 200°C., the primed skeleton is provided with a layer of catalytically active carrier material, is further dried at a temperature between about 100° and 250°C. and is then calcined at a temperature between about 600° and 1200°C., preferably at a temperature between 800° and 1100°C. for 10 to 20 minutes. Finally, the catalytically active carrier is impregnated with one or more catalytically active metals and/or metal oxides.

Therefore, the catalyst manufactured in accordance with the process of the present invention is comprised of a non-rusting, scale-free and highly heat resistant metallic skeleton, an elastic primer layer of aluminum silicate upon the surface of the skeleton, a layer of catalytically active carrier material upon the primer layer and one or more catalytically active metals and/or metal oxides upon the carrier layer. A catalyst such as this does not manifest the abovementioned disadvantages of known catalysts. As a result of the elastic interlayer of aluminum silicates, the catalytically active layer is bound to the supporting structure so strongly that even under high mechanical and alternating thermal stress the catalytic activity is maintained for long periods of use. Furthermore, the catalyst prepared in accordance with the process of the present invention is characterized by the fact that it possesses a very high mechanical strength as a result of its metallic structure and can be installed without expensive mounting in a steel housing.

The metallic base can be in the form of a metal band or a cell-like or honeycomb structure. Wide metal bands can be corrugated and/or rolled up to produce the necessary shaped structures, whereas narrow bands or wires can be balled-up. It is also possible to employ shaped metallic bodies such as rings or saddles, and tubes and/or tube bundles are further suitable embodiments for the metal base component of the present catalyst.

As illustrated in the drawings, a preferred embodiment of a honeycomb structure having low resistance to gas flow therethrough and having a large surface area results, for example, from the forming of a long metal band of approximately 40 to 250 mm. width in such a way that there formed small transverse steps 1 having either corrugated, triangular-shaped or trapezoidal-shaped cross-section. In order to insure a low volumetric weight of the catalyst, the thickness of the metal band should lie between about 0.02 and 0.2 mm., and more preferably between about 0.03 and 0.08 mm. The thus-formed metal sheet is then rolled up into a spiral about a mandrel or a flat bar 2, and every course of the pre-formed metal band is separated from the next course by an intermediate band of metal 3 which has not been formed in the above-described manner. The resulting honeycomb shape of round and-/or oval cross-section is inserted under tension into a correspondingly shaped tube 4 of round and/or oval cross-section. In order to prevent a displacement of the individual courses in a longitudinal direction, the tube can be somewhat longer than the metal sheet. The courses of the honeycomb structure are fixed by means of narrow cross connections 5 at the ends of the tube.

The highly heat resistant and corrosion resistant metallic skeleton may comprise, for example, alloys having the following composition: chromium-nickel steel with a maximum of 30 percent chromium and 25 percent nickel or with a maximum of 30 percent chromium and 5 percent aluminum. Similarly, there can be employed nickel alloys having 70 to 80 percent nickel, which can also be partially replaced by cobalt with 10 to 20 percent chromium and additions of molybdenum, aluminum and/or titanium. The metallic skeleton can be used in a pickled or etched condition. A further suitable material for the metallic skeleton comprises a normal carbon steel without special alloying additives which obtains its heat and scale resistance as a result of a coating of enamel which is resistant to temperatures of up to at least 1000°C. The use of an enameled steel for the skeleton has the advantage of being inexpensive when compared to the above-named scale-free, highly heat resistant high-grade steels. It is also a requirement, however, that the enamel layer does not peel in the case of high stress due to changes in temperature.

Application of the elastic priming layer of aluminum silicate and the layer of catalytically active carrier material can be accomplished either upon the finished metallic skeleton structure or before the manufacture of the formed structure by applying the corresponding layers to non-rusting, scale-resistant and heat-resistant metal bands and/or enamel carbon steel and then forming the coated stock material into the desired cellular structure.

The elastic priming layer of aluminum silicate may be applied according to any known coating procedure; however, it is preferred that the priming layer for the metallic skeleton comprise aluminum silicate fibers which are suspended in a fluid medium, preferably an aqueous medium. The suspension containing 10 to 70 percent of aluminum silicate fibers may optionally and preferably contain an inorganic binder material, for example, from about 2 to 25 percent colloidal silicic acid or colloidal aluminum hydroxide. In connection with this embodiment, coating is accomplished by dipping the metallic stock material or the finished skeleton structure in the suspension. In view of the fact that very thin layers in the range of approximately 5 to 80 microns, and preferably between 10 and 40 microns, are suitable for achieving a good bond of the catalytically active layer to the base structure, even in the case of strong mechanical and alternating thermal stress it is sufficient to employ only a single dipping step. The temperature at which the coating is brought onto the metallic base is not significant, and the step is normally carried out at or near room temperature. After coating, the priming layer is dried to produce an elastic layer on the metallic base, and whereas any suitable drying conditions will suffice, it is preferred to dry for a short period of time at an elevated temperature between about 100° and 250°C., most preferably at about 200°C.

The metallic skeleton bearing the elastic primer layer of aluminum silicate serves as an excellent base for application of many known catalytically active compositions. Any conventional catalyst carrier material may be applied to this base in the production of a suitable catalyst for the purification of exhaust gases; however, it is preferred in accordance with the present invention to next apply a layer of a catalytically active carrier material. Suitable catalytically active carrier materials include the following: $Al_2O_3$, MgO rare earth metal oxides like cerium oxide, lanthanum oxide, neodymium oxide, praseodymium oxide and mixture of these oxides. The thickness of the active carrier layer lies in the range between 2 and 50 $\mu$ preferably between 5 and 15 $\mu$.

In the preferred embodiment of the present invention, there is employed to form the layer of catalytically active carrier material aluminum hydroxide or magnesium hydroxide. These materials are suitably employed in the form of highly dispersed aqueous suspensions, whereby the coating is then carried out by dipping the primed metallic skeleton or the primed metallic stock material in the suspension. The thus-coated primed metallic substrate is then dried, preferably at a temperature between about 100° and 250°C., most preferably at about 200°C. and is thereafter calcined at a temperature between about 600° and 1200°C., preferably between about 800° and 1100°C. This calcination of the active carrier layer at a high temperature is essential in order to achieve the temperature stability of the finished catalyst.

The catalyst carrier prepared in the foregoing manner may have catalytically active metals and/or metal oxides distributed thereon in any conventional manner, e.g., by impregnation with a solution of compounds of the metals, such as, platinum, palladium, ruthenium, rhodium, osmium, iridium, rhenium, chromium, copper, silver, manganese iron, cobalt, nickel and the like. For the purification of automobile exhaust gases, a combination of different platinum group metals is particularly suitable. The metallic components may also be applied to the catalyst structure simultaneously with the catalytically active carrier layer of, for example, aluminum hydroxide and/or magnesium hydroxide.

In a preferred embodiment of the present invention, the suspension of highly dispersed aluminum hydroxide or magnesium hydroxide further contains as an additive between about 0.5 to 15 percent, preferably between about 1 and 7 percent of a finely dispersed oxide of one or more rare earth metal oxides (particle size less than 10 $\mu$ and preferably less than 3 $\mu$) calculated on aluminium or magnesium oxide respectively. Such an additive minimizes the migration of the catalytically active metallic compounds into the metallic skeleton at temperatures up to about 1000°C. As rare earth metal oxides, there may be employed either individual oxides of rare earth metals, e.g., cerium oxide, lanthanum oxide, neodymium oxide, praseodymium oxide, preferably with a purity of between about 85 and 99.9 percent, as well as mixtures of the respective rare earth metal oxide.

It has been shown that with long application of temperatures above 870°C., the catalytically active metallic components, normally noble metals, begin to diffuse and migrate out of the catalytically active layer into the metallic skeleton, whereby the activity of the catalyst is decreased. Thermal stresses of this type are possible in connection with the operation of motor vehicles on long trips and/or at high performance levels, so that this loss of catalytic activity is evident.

Quite surprisingly, the diffusion and migration is not prevented if one or more salts of the rare earth metals are dissolved in the suspension of aluninum and/or magnesium hydroxide or if the catalytically active layer is subsequently impregnated with a rare earth metal salt solution. The use of the oxides in place of rare earth metal salts has a further advantage in addition to the effect described above, namely, that the rare earth metal oxides are less expensive than rare earth metal salts.

Of the above-named catalytically active metals, platinum and palladium are especially suitable for the oxidation of carbon monoxide and incompletely burned hydrocarbons in automobile and industrial exhaust gases. A particularly suitable catalyst for this purpose contains between about 0.01 and 1 percent, and preferably between about 0.02 and 0.5 percent by weight of platinum and/or palladium upon the carrier prepared in accordance with the present invention.

Ruthenium and platinum containing catalysts have proven to be particularly effective for the reduction of nitrogen oxides in automobile and industrial exhaust gases. An especially suitable catalyst for this purpose is one prepared in accordance with the process of the present invention which contains between about 0.02 and 0.5 weight percent each of ruthenium and platinum, wherein the ratio of ruthenium to platinum is between about 1:0.15 and 1:3.

The following examples are provided to more clearly illustrate the manufacture and application of the catalyst according to the present invention, it being understood that the examples are intended to be illustrative and not limitative.

EXAMPLE 1

A honeycomb shaped configuration is prepared from a non-rusting, non-scaling and thermally stable steel sheet consisting of 15.1 percent nickel, 22.2 percent chromium, 60.15 percent iron, 0.8 percent manganese, 1.7 percent silicon and 0.05 percent carbon, the sheet being 50 $\mu$ in thickness. The shaped structure, in a degreased and clean condition, is dipped in a suspension of fibrous aluminum silicate in an aqueous colloidal silicic acid solution. As the aluminum silicate component, there is employed a commercially available product marketed by the Carborundum Company under the designation "Fiberfrax QF 180" [R]. After drying at 200°C., the skeleton structure is dipped into a suspension consisting of 20 percent by weight of a highly dispersed pseudo-boehmite in water. Pseudoboehmite is a poorly crystallized aluminum oxide hydroxide (See I. W. Newsome, Alumina Properties, Technical Paper No. 10, Aluminum Company of America, 1960). After drying at 200°C. and calcining at 900°C. for 30 minutes, the layer of aluminum silicate is approximately 20 $\mu$ in thickness and the layer of catalytically active aluminum oxide is approximately 10 $\mu$ in thickness.

The skeleton structure prepared in the foregoing manner is then impregnated with a solution containing so much platinum tetrammine hydroxide, that the catalyst No. 1 contains approximately 0.1 weight percent platinum after drying at 120°C. and calcining at 800°C. for 30 minutes.

EXAMPLE 2

The metallic structure coated with layers of aluminum silicate and aluminum oxide as described in Example 1 is treated with a mixture of platinum tetrammine hydroxide and ruthenium hydroxy-chloro-tetrammine hydroxide solution containing so much platinum and ruthenium that the catalyst No. 2 contains about 0.1 weight percent platinum and 0.05 weight percent ruthenium after drying at 120°C. and calcining at 800°C. for 30 minutes.

EXAMPLE 3

The metallic skeleton which has been provided with a flexible interlayer of aluminum silicate in Example 1 is dipped into a suspension containing 20 percent pseudo-boehmite in water and so much platinum in the form of platinum tetrammine hydroxide that the finished catalyst No. 3 contains approximately 0.1 weight percent platinum after drying at 120°C. and calcining at 800°C. for 30 minutes.

EXAMPLE 4

(Comparative example not in accordance with present invention.)

In order to demonstrate that only the process of the present invention leads to a technically usable result, a carrier structure described in Example 1 of non-rusting, non-scaling, thermally stable steel sheet is dipped in a suspension of 20 percent highly dispersed pseudo-boehmite, dried at 200°C. and calcined at 900°C. for 30 minutes. Finally, the carrier structure is treated with a platinum tetrammine hydroxide solution containing so much platinum that the final catalyst No. 4 contains about 0.1 weight percent platinum after drying at 120°C. and calcining at 800°C. for 30 minutes.

EXAMPLE 5

A cell-like structure is manufactured from alternate corrugated and flat steel sheets disposed upon one another, which have been rendered tinder and heat resistant by a surface coating of a refractory enamel coating. The cell-like structure is similar in its geometry to the honeycomb ceramic structures of, for example, those described in U.S. Pat. No. 3,444,925. This structure is prepared as described in Example 1 so that the finished catalyst No. 5 contains approximately 0.1 weight percent platinum after drying at 120°C. and calcining at 800°C.

EXAMPLE 6

In order to examine the oxidation activity, the catalysts prepared according to Examples 1, 3, 4 and 5 are tested with a mixture of gases which contains either 1 volume percent CO, 4 volume percent $O_2$, 95 volume percent $N_2$ or 500 ppm. of n-$C_6H_{14}$ 4 volume percent $O_2$, 95.95 volume percent of $N_2$. At a space velocity of 50,000 h.$^{-1}$, the gas stream is heated from room temperature up to 550°C. before entrance into the catalyst bed, and the conversion is measured as a function of the temperature and recorded. The temperature required for the conversion of 50 percent of the amount of CO or n-hexane introduced serves as the activity coefficient.

After testing in a fresh condition under the above-indicated conditions, the catalysts are subjected to a heat shock test. In this test, the catalysts are alternately heated during a 5 minute period by a gas stream at 850°C., and subsequently are cooled during a similar period of time by a cold air stream of approximately 20°C. After repeating this cycle 200 times, a new activity test is undertaken.

Next follows an aging test under engine operating conditions, in accordance with which the catalyts are subjected to a gas temperature between 700° and 800°C. at a space velocity of 50,000 h.$^{-1}$. The catalysts are again tested after 100 hours of aging under these conditions.

The results are summarized in Table 1. They show that, when the catalyst structure is prepared by placing a layer of active aluminum oxide directly on the metallic skeleton without the interposed elastic priming layer of aluminum silicate, a catalyst is obtained having a catalytic activity, already in the unused state, considerably below that of the catalysts obtained in accordance with the process of the present invention. The activity is drastically lowered also as a result of alternating thermal stress and still more under practical use, so that the known catalysts are not suitable for application in motor vehicles. On the other hand, the catalysts produced in accordance with the present invention possess, even after the considerable stress of 200 heat shocks an additional 100 hour use under engine operating conditions, a better activity than the known catalysts in fresh condition.

TABLE 1

| Catalyst | Aging | 50% CO-Conv. | 50% Hexane-Conv. |
|---|---|---|---|
| 1 | fresh | 196°C. | 202°C. |
| | 200 Heat shocks | 214°C. | 226°C. |
| | +100h. Engine op. cond. | 242°C. | 233°C. |
| 3 | fresh | 191°C. | 218°C. |
| | 200 Heat shocks | 231°C. | 245°C. |
| | +100h. Engine op. cond. | 256°C. | 254°C. |
| 4 | fresh | 280°C. | 240°C. |
| | 200 Heat shocks | 359°C. | 367°C. |
| | +100h. Engine op. cond. | 410°C. | 553°C. |
| 5 | fresh | 205°C. | 238°C. |
| | 200 Heat shocks | 212°C. | 246°C. |
| | +100h. Engine op. cond. | 251°C. | 272°C. |

EXAMPLE 7

For the purpose of testing the reduction activity, catalyst No. 2 is tested with a mixture of gases which is similar in its constitution to an automobile exhaust gas. It contains 10 volume percent $CO_2$, 14 volume percent $H_2O$, 4 volume percent CO, 0.5 volume percent $H_2$, 1000 ppm. NO, 0–2.3 volume percent $O_2$, and the balance $N_2$. The oxygen content is varied between 0 and 2.3 volume percent. The testing is carried out at a space velocity of 50,000 $h.^{-1}$ and a gas introduction temperature of 500°C., with testing being carried out with a catalyst in fresh condition, after 200 heat shocks, as described in Example 6, as well as after 100 hours of aging under engine operating conditions. There is measured both the reduction of nitrogen oxides to nitrogen as well as the production of ammonia which may result concurrently under the test conditions. The production of ammonia, naturally, should be suppressed as much as possible, so that nitrogen oxides are not again produced in the subsequent oxidative treatment of the exhaust gas in the second catalyst bed attached in series.

The conversion value of NO obtained under the specified conditions, as well as the $NH_3$ formed are plotted against the relationship $$L = \frac{[O_2] + 0.5[NO]}{0.5[CO] + 0.5[H_2]}$$

If $L$ is equal to 1, then the oxidizing and reducing reaction components stand in stoichiometric relationship; if $L$ is less than 1, then the reducing components are in excess and with a relationship of $L$ greater than one the oxidizing components are in excess. A complete reduction of the nitrogen oxides is therefore to be expected only when $L$ is less than or equal to 1.

The effectiveness of the reduction catalyst at various values of $L$ may be seen from Table 2. The values show that under reducing conditions up to the stoichiometric relationship of the reducing and oxidizing components, a complete reduction of the nitrogen oxide always takes place and this is true with the fresh catalyst as well as with the catalyst which has been subjected to alternating thermal stress and aging under engine operating conditions. The formation of ammonia even under reducing conditions is practically eliminated up to a value of $L = 0.33$ (corresponding to an oxygen content of the test gas of 0.7 percent) and is also at low values of $L$, i.e., under strongly reducing conditions, exceptionally small. This advantageous property of the catalyst is not impaired as a result of the requirements existing in practical use.

TABLE 2

Catalyst No. 2

| $L = \dfrac{[O_2] + 0.5[NO]}{0.5[CO] + 0.5[H_2]}$ | fresh | | 200 Heat shocks | | + 100h. Engine op. cond. | |
|---|---|---|---|---|---|---|
| | NO-Conv. % | $NH_3$-formation ppm. | NO-Conv. % | $NH_3$-formation ppm. | NO-Conv. % | $NH_3$-formation ppm. |
| 0.02 | 100 | 60 | 100 | 50 | 100 | 50 |
| 0.07 | 100 | 60 | 100 | 50 | 100 | 70 |
| 0.11 | 100 | 50 | 100 | 50 | 100 | 50 |
| 0.15 | 100 | 40 | 100 | 35 | 100 | 40 |
| 0.24 | 100 | 20 | 100 | 25 | 100 | 15 |
| 0.33 | 100 | 7 | 100 | 15 | 100 | 7 |
| 0.51 | 100 | 2 | 100 | 3 | 100 | 3 |
| 0.82 | 100 | 2 | 100 | 1 | 100 | 0 |
| 0.87 | 100 | 1 | 100 | 1 | 100 | 0 |
| 0.91 | 100 | 1 | 100 | 0 | 100 | 0 |
| 0.96 | 100 | 1 | 100 | 0 | 100 | 0 |
| 1.00 | 100 | 0 | 100 | 0 | 90 | 0 |
| 1.04 | 49 | — | 48 | — | 38 | — |

EXAMPLE 8

The carrier specified in Example 1 is coated with aluminum silicate in the same manner as described in that example, and after drying at 200°C., it is dipped in an aqueous suspension which contains 20 percent by weight of highly dispersed pseudo-boehmite and 1.25 weight percent of highly dispersed commercial cerium oxide (particle size less than 3 microns). After drying at 200°C. and calcining at 900°C. for 30 minutes, the carrier structure is treated with a solution of platinum tetrammine hydroxide and palladium tetrammine hydroxide containing so much platinum and palladium, that the finished catalyst No. 6 contains 0.18 weight percent platinum and 0.1 weight percent palladium after drying at 120°C. and calcining at 800°C. for 30 minutes.

EXAMPLE 9

The metallic, honeycomb carrier structure of Example 1 is provided with a layer of Fiberfrax as described in Example 1 and is dipped in an aqueous suspension containing 20 weight percent highly dispersed pseudo-boehmite and 1.25 weight percent of a highly dispersed mixture of cerite earth metals in oxide form (50 percent cerium, 20 percent lanthanum, 10 percent neodymium, 10 percent praseodymium, etc.). Drying is accomplished at 120°C. and calcining at 900°C. for 30 minutes. Catalyst Nos. 7 and 8 are prepared from carriers which have been produced in accordance with this procedure.

The preparation of Catalyst No. 7 takes place in the same manner as described in Example 1. The impregnation of Catalyst No. 8 is accomplished with a platinum tetrammine hydroxide solution and the impregnation for catalyst No. 9 is accomplished with a solution containing platinum tetrammine hydroxide and ruthenium hydroxo- chloro-tetrammine hydroxide, and the concentrations are selected so that the finished catalysts contain the following content of noble metals after drying at 120°C. and calcining at 900°C.

| Catalyst No. | Noble Metal Content |
|---|---|
| 7 | 0.18 wt. % platinum + 0.1 wt. % palladium |
| 8 | 0.18 wt. % platinum |
| 9 | 0.1 wt. % platinum + 0.05 wt. % ruthenium |

EXAMPLE 10

In order to demonstrate that an impregnation of the carrier coated only with aluminum silicate and aluminum oxide with salts of the rare earth metals before applying the noble metals does not lead to success in accordance with the present invention, catalysts are prepared according to the following process:

The metallic, honeycomb carrier structure described in Example 1 is coated with a layer of Fiberfrax as in Example 1 and is dipped in an aqueous suspension of 20 percent highly dispersed pseudo-boehmite. After drying at 120°C. and calcining at 900°C., there follows an impregnation with cerium nitrate solution containing so much cerium that the carrier layer of the catalyst contains about 5 weight percent cerium in the form of $CeO_2$ after drying at 120°C. and calcining at 900°C. From carriers prepared according to this process there are prepared by treatment with noble metal containing solutions, the following catalysts having the specified content of noble metals:

| Catalyst No. | Noble Metal Content | Noble Metal Preparation According to Ex. |
|---|---|---|
| 10 | 0.18 wt. % Pt + 0.1 wt. % Pd | 6 |
| 11 | 0.18 wt. % Pt | 9 |
| 12 | 0.1 wt. % Pt + 0.05 wt. % Ru | 9 |

EXAMPLE 11

The addition of salts of rare earth metals into the aqueous suspension of the highly dispersed pseudo-boehmite likewise does not lead to the results of the present invention. In order to demonstrate this, catalysts are prepared in accordance with the following processes:

The metallic, honeycomb carrier structure described in Example 1 is coated with a layer of Fiberfrax as in Example 1 and is dipped in a suspension containing 20 percent by weight highly dispersed pseudo-boehmite and 3.1 weight percent of $Ce(NO_3)_3 \cdot 6H_2O$ in water. Drying is accomplished at 120°C. and calcining at 900°C. Catalysts containing the following specified contents of noble metals are prepared from carrier produced in the foregoing manner by treatment with noble metal solutions:

| Catalyst No. | Noble Metal Content | Noble Metal Preparation According to Ex. |
|---|---|---|
| 13 | 0.18 wt. % Pt + 0.1 wt. % Pd | 6 |
| 14 | 0.18 wt. % Pt | 9 |
| 15 | 0.1 wt. % Pt + 0.05 wt. % Ru | 9 |

EXAMPLE 12

In order to test the oxidation activity, catalyst Nos. 6, 7, 8, 10, 11, 13 and 14 are tested with a mixture of gases containing:
  300 pp. ethylene
  1 volume percent carbon monoxide
  10 volume percent water vapor
  10 volume percent $CO_2$
  3 volume percent oxygen
  balance $N_2$ The space velocity is 40,000 $h.^{-1}$. The residual content of CO and ethylene is determined at various step-wise increases in the temperature at which the gas is introduced into the catalyst bed by analyzing the gas stream exiting from the catalyst bed with Uras*/(to determine CO) and FID**/(to determine ethylene content), with the measurement taking place after establishment of thermal equilibrium in the nearly adiabatic reactor.

*/nondispersive infrared analyzer
**/flame ionization detector

After testing the catalysts in fresh condition under the indicated conditions, the catalysts were each aged in air for 24 hours respectively at 870° and 980°C. After each aging step, a new activity test was carried out. The results are set forth in Table 3 as half-value temperatues.

EXAMPLE 13

The reduction activities of catalyst Nos. 9, 12 and 15 are tested under the conditions set forth in Example 7. After testing the catalysts in a fresh condition, the catalysts are aged in air for 24 hours respectively at 870° and 980°C. After each aging step, a new activity test is carried out. The results are set forth in Table 4.

The results show that thermally stable catalysts are obtained irrespective of the noble metal composition and the test procedures applied, particularly if the application of the layer of carrier material is carried out with the addition of one or more oxides of the rare earth metals (catalyst Nos. 6–9).

If the rare earth metals are added in the form of their salt solutions to the layer of carrier material after it has been applied (catalyst Nos. 10–12), or when they are added as salt solutions to the aqueous suspension of aluminum hydroxide and/or magnesium hydroxide prior to coating with the layer of carrier material, then there is exhibited a noticeable impairment of the activity in the case of long, continuous use at temperatures of 870°C. and above.

TABLE 3

| Catalyst | Aging | CO conversion of 50% (°C) | Hydrocarbon Conversion of 50% (°C) |
|---|---|---|---|
| 6 | fresh | 239 | 239 |
|   | 24 h. at 870°C. | 245 | 252 |
|   | 24 h. at 980°C. | 260 | 275 |
| 7 | fresh | 208 | 208 |
|   | 24 h. at 870°C. | 215 | 218 |
|   | 24 h. at 980°C. | 236 | 241 |
| 8 | fresh | 259 | 259 |
|   | 24 h. at 870°C. | 266 | 267 |
|   | 24 h. at 980°C. | 272 | 276 |
| 10 | fresh | 227 | 226 |
|   | 24 h. at 870°C. | 254 | 273 |
|   | 24 h. at 980°C. | 338 | not accomplished |
| 11 | fresh | 305 | 305 |
|   | 24 h. at 870°C. | 330 | 330 |
|   | 24 h. at 980°C. | 490 | 495 |
| 13 | fresh | 213 | 215 |
|   | 24 h. at 878°C. | 243 | 271 |
|   | 24 h. at 980°C. | 327 | not accomplished |
| 14 | fresh | 276 | 276 |
|   | 24 h. at 870°C. | 311 | 312 |
|   | 24 h. at 980°C. | 486 | 492 |

TABLE 4

| Aging | Temp. (°C) | Space Vel. (h.$^{-1}$) | L | Cat. No. 9 | | Cat. No. 12 | | Cat. No. 15 | |
|---|---|---|---|---|---|---|---|---|---|
| | | | | NO-conv. % | NH$_3$-formation ppm. | NO-conv. % | NH$_3$-formation ppm. | NO-conv. % | NH$_3$-formation ppm. |
| fresh | 500 | 50,000 | 0.02 | 100 | 60 | 100 | 110 | 100 | 90 |
| | | | 0.07 | 100 | 60 | 100 | 100 | 100 | 90 |
| | | | 0.11 | 100 | 50 | 100 | 75 | 100 | 75 |
| | | | 0.16 | 100 | 40 | 100 | 60 | 100 | 60 |
| | | | 0.24 | 100 | 20 | 100 | 50 | 100 | 40 |
| | | | 0.33 | 100 | 7 | 100 | 30 | 100 | 20 |
| | | | 0.49 | 100 | 2 | 100 | 15 | 100 | 8 |
| | | | 0.82 | 100 | 2 | 100 | 3 | 100 | 1 |
| | | | 0.87 | 100 | 2 | 100 | 2 | 100 | 1 |
| | | | 0.91 | 100 | 1 | 100 | 2 | 100 | 1 |
| | | | 0.96 | 100 | 1 | 100 | 1 | 100 | 1 |
| | | | 1.00 | 100 | 1 | 100 | 1 | 100 | 1 |
| | | | 1.05 | 46 | — | 40 | — | 45 | — |
| 24 h. at 870°C | | | 0.02 | 100 | 60 | 100 | 40 | 100 | 70 |
| | | | 0.07 | 100 | 70 | 100 | 35 | 100 | 70 |
| | | | 0.11 | 100 | 30 | 100 | 35 | 100 | 60 |
| | | | 0.16 | 100 | 25 | 100 | 28 | 100 | 40 |
| | | | 0.24 | 100 | 15 | 100 | 20 | 100 | 20 |
| | | | 0.33 | 100 | 5 | 100 | 15 | 100 | 15 |
| | | | 0.49 | 100 | 3 | 100 | 5 | 100 | 4 |
| | | | 0.82 | 100 | 1 | 100 | 3 | 100 | 3 |
| | | | 0.87 | 100 | 1 | 100 | 2 | 99 | 2 |
| | | | 0.91 | 100 | 1 | 99 | 2 | 99 | 2 |
| | | | 0.96 | 100 | 1 | 98 | 2 | 97 | 2 |
| | | | 1.00 | 100 | 1 | 96 | 1 | 95 | 1 |
| | | | 1.05 | 40 | — | 30 | — | 35 | — |
| 24 h. at 980°C | 500 | 50,000 | 0.02 | 100 | 40 | 44 | 10 | 70 | 40 |
| | | | 0.07 | 100 | 35 | 47 | 10 | 79 | 30 |
| | | | 0.11 | 100 | 30 | 60 | 10 | 81 | 30 |
| | | | 0.16 | 100 | 20 | 60 | 8 | 80 | 20 |
| | | | 0.24 | 100 | 10 | 60 | 6 | 80 | 10 |
| | | | 0.33 | 100 | 5 | 54 | 5 | 80 | 3 |
| | | | 0.49 | 100 | 3 | 51 | 3 | 80 | 2 |
| | | | 0.82 | 100 | 1 | 43 | 0 | 55 | 1 |
| | | | 0.87 | 100 | 0 | 30 | 0 | 54 | 1 |
| | | | 0.91 | 100 | 0 | 26 | 0 | 52 | 1 |
| | | | 0.96 | 99 | 0 | 21 | 0 | 49 | 1 |
| | | | 1.00 | 98 | 0 | 21 | 0 | 41 | 1 |
| | | | 1.05 | 32 | — | 10 | — | 23 | — |

What is claimed is:

1. In a process for the preparation of a highly heat resistant, thermal shock resistant and break resistant catalyst suitable for the purification of exhaust gases, comprising the steps of coating a non-rusting, scale-free highly heat resistant metal skeleton with a layer of a catalytically active carrier material, calcining the coated skeleton at a temperature of from about 600° to 1200°C. and distributing one or more catalytically active metals or metal oxides upon the layer of catalyst carrier, the improvement which comprises coating said skeleton with an elastic primer layer comprising aluminum silicate prior to applying said layer of catalytically active carrier material.

2. The process as defined by claim 1, wherein said metallic skeleton is in the form of a pre-formed catalyst carrier prior to application of said primer layer.

3. The process as defined by claim 1, wherein said metallic skeleton is in the form of a cellular honeycomb structure having a wall thickness of between about 0.02 and 0.2 mm.

4. The process as defined by claim 1, wherein said metallic skeleton is in the form of a cellular honeycomb structure having a wall thickness of between about 0.03 and 0.08 mm.

5. The process as defined by claim 2, wherein said metallic skeleton is in the form of a band and said band is convoluted into a rolled, corrugated or balled shape.

6. The process as defined by claim 2, wherein said metallic skeleton is in the form of tubes, bundles of tubes, rings or saddles.

7. The process as defined by claim 1, wherein said metallic skeleton is coated with said primer layer and the catalytically active layer while in the form of metallic stock material and further comprising the setp of forming said stock material into a cellular carrier body subsequent to said coating steps.

8. The process as defined by claim 1, wherein said priming step comprises dipping the metallic skeleton into an aqueous suspension of fibrous aluminum silicate.

9. The process as defined by claim 8, wherein said suspension further contains an inorganic binder material.

10. The process as defined by claim 1, wherein said step of providing a layer of catalytically active carrier material comprises dipping the primed skeleton into an aqueous suspension of a highly dispersed carrier material selected from the group consisting of aluminum hydroxide and magnesium hydroxide and calcining the thus-coated skeleton at a temperature of between about 600° and 1200°C.

11. The process as defined by claim 10, wherein said catalytically active carrier material is aluminum hydroxide and said calcining temperature is between about 600° and 1100°C.

12. The process as defined by claim 10, wherein said catalytically active carrier material is magnesium hydroxide and said calcining temperature is between about 700° and 1200°C.

13. The process as defined by claim 1, wherein the steps of coating the skeleton with a layer of catalytically active carrier material and distributing one or more catalytically active metals or metal oxides on said carrier are conducted simultaneously.

14. The process as defined by claim 10, wherein said improvement further comprises said dispersion of catalytically active carrier material containing from about 0.5 to 15 percent by weight of one or more highly dispersed rare earth metal oxides calculated on the applied aluminum oxide or magnesium oxide.

15. The process as defined by claim 14, wherein said rare earth metal oxide has a purity of from about 85 to 99.9 percent.

16. The process as defined by claim 14, wherein a mixture of rare earth oxides is employed.

17. The process as defined by claim 14, wherein the particle size of said rare earth oxide is less than about 10 microns.

18. In a highly temperature resistant, thermal shock resistant and break resitant catalyst suitable for the purification of exhaust gases, comprising a non-rusting, scale-free, highly heat resistant metallic skeleton having thereon an outer layer comprising a catalytically active carrier material and one or more catalytically active metals or metal oxides distributed on said carrier layer, the improvement comprising an elastic priming layer comprising aluminum silicate between said skeleton and said outer layer.

19. The catalyst as defined by claim 18, wherein said catalytically active metal or metal oxide comprises a noble metal selected from platinum, palladium and mixtures thereof present in an amount between about 0.01 and 1.0 percent by weight.

20. The catalyst as defined by claim 18, wherein said catalytically active metals are present in an amount of from 0.01 and 0.5 percent by weight and comprise a mixture of ruthenium and platinum in a ratio of from about 1:0.15 to 1:3.

21. The catalyst as defined by claim 18, wherein said metallic skeleton consists of an alloy steel.

22. The catalyst as defined by claim 18, wherein said metallic skeleton comprises normal carbon steel having a coating of an enamel resistant to temperatures up to about 1000° C.

23. The catalyst as defined by claim 18, wherein the thickness of the elastic priming layer of aluminum silicate is between about 5 and 80 microns and the thickness of the layer of catalytically active material is between about 2 and 50 microns.

24. The catalyst as defined by claim 18, wherein said catalytically active carrier material is selected from the group consisting of calcined aluminum hydroxide and calcined magnesium hydroxide.

25. The catalyst as defined by claim 24, wherein said improvement further comprises said layer of catalytically active material comprising between about 0.5 and 15 percent by weight of one or more highly dispersed rare earth metal oxides calculated on the applied aluminum or magnesium oxide.

26. The process as defined by claim 14, wherein said rare earth metal oxide is selected from the group consisting of cerium oxide, lanthanum oxide, neodymium oxide and praseodymium oxide.

27. The catalyst as defined by claim 25, wherein said rare earth metal oxide is selected from the group consisting of cerium oxide, lanthanum oxide, neodymium oxide and praseodymium oxide.

28. The process as defined by claim 9, wherein said inorganic binder material is selected from the group consisting of colloidal silicic acid and colloidal aluminum hydroxide.

* * * * *